May 15, 1928.
L. W. VON GANS
1,669,729
AMPULE
Filed Aug. 28, 1926
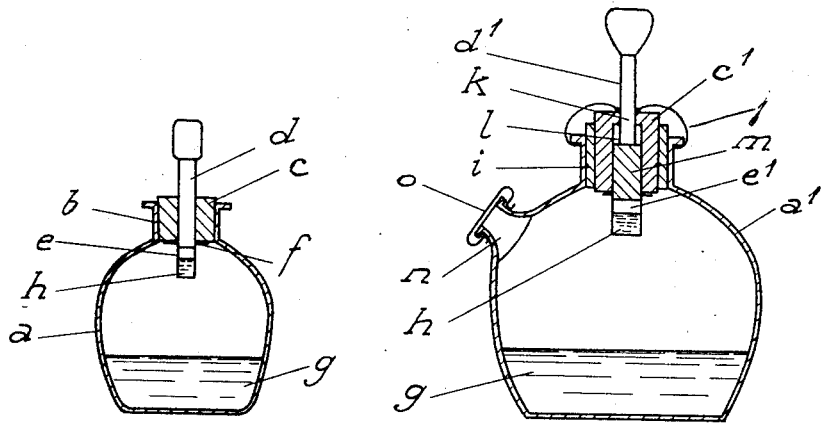
Fig. 1.    Fig. 2.
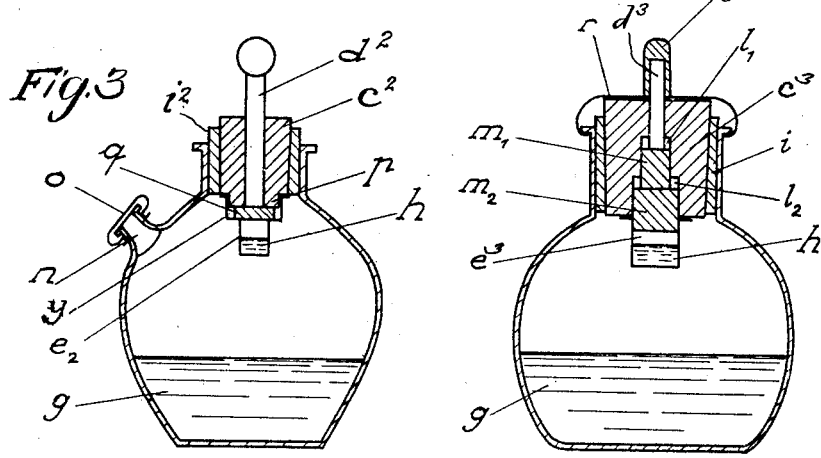
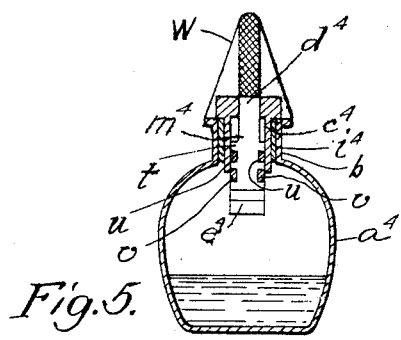
Fig. 5.
Fig. 4.
Inventor:
Ludwig Wilhelm von Gans
by [signature] Atty.

Patented May 15, 1928.

1,669,729

UNITED STATES PATENT OFFICE.

LUDWIG WILHELM VON GANS, OF OBERURSEL, KESTENHOH, GERMANY, ASSIGNOR TO THE FIRM: "PHARMAGANS" PHARMACEUTISCHES INSTITUT LUDWIG WILHELM GANS A.-G., OF OBERURSEL, GERMANY, A SOCIETY OF GERMANY.

AMPULE.

Application filed August 28, 1926, Serial No. 132,273, and in Germany January 5, 1926.

My invention refers to storage vessels for medicinal solutions and more especially to ampules filled with solutions of pharmaceutical preparations for subcutaneous and intramuscular injections. It is an object of my invention to provide an ampule or liquid container in which can be stored different components, such as two liquids or a liquid and a solid compound, which when mixed would soon be subject to decomposition.

The ampule according to the present invention comprises an outer container which may consist of glass, porcelain or the like and forms the ampule proper, an inner container of the same or some other suitable material, and means such as a glass rod or the like extending through a packing, for instance a stopper, into the outer container and holding the inner container in such position that its upper end is fixed above the level of the liquid stored within the outer container. This holding means may at the same time serve to close the opening of the inner container. If it is desired to mix the contents of the inner container with the contents of the outer container, for instance if an injection shall be made, the holding means, for instance the rod, on being withdrawn from the stopper or other device closing the outer container will release its hold on the inner container, whereby this latter is dropped in the outer container and its contents allowed to mix with the contents of the outer container.

In the drawings affixed to this specification and forming part thereof several forms of a composite container embodying my invention are illustrated by way of example, in vertical cross-section.

Referring first to Fig. 1, $a$ is the outer container or ampule, $b$ is its neck, $c$ is a stopper made of cork, ebonite, porcelain, or the like and tightly closing the neck opening, $d$ is a glass or porcelain rod extending into the ampule $a$ through an axial boring of the stopper. $e$ is a small auxiliary container suspended from the bottom end of rod $d$ which extends into it and closes it. $f$ is a broad rim forming part of the auxiliary container $e$ and lying flush against the bottom face of the stopper. The ampule or main container $a$ may hold a liquid $g$, the auxiliary container another liquid or a solid substance $h$. If it is desired to mix the contents of the two containers, rod $d$ is pulled upwards in the stopper boring, thereby disengaging the auxiliary container $e$ which drops into the liquid $g$, emptying its contents into it. After the mixture or solution has thus been effected, it can be withdrawn through the stopper boring by means of a syringe or the like when the rod is withdrawn altogether from the boring.

In the modification illustrated in Fig. 2 the ampule $a^1$ is closed by means of a stopper which may consist of non-elastic material, for instance hard rubber, celluloid, glass, porcelain, synthetic resin, or the like, an elastic packing $i$, for instance a rubber tube, being inserted between the stopper and the neck. The stopper boring is made in two parts, a narrow one on top and a wider one $l$ adjoining same. The rod $d^1$ carries a piston-like enlargement $m$, the rod $d^1$ extending from the narrow part of the boring while the piston $m$ fills the wider part $l$ and has fixed to its bottom end the inner or auxiliary container $e^1$. A cap $j$ engaging the ring of the neck prevents the withdrawal of the stopper $c^1$ if the piston $m$ is lifted by means of rod $d^1$ to disengage the auxiliary container $e^1$. The shoulder between the parts $d^1$ and $m$ prevents the piston $m$ from being pulled out altogether. In this modification the main container $a^1$ has a separate lateral opening $n$ closed by a cap $o$. After removal of this cap the solution or mixture obtained after the auxiliary container has been disengaged from the piston can be withdrawn by means of a syringe or the like.

In the modification shown in Fig. 3 the stopper $c^2$ is held in the neck by a rubber tube or other soft packing $i^2$ as described with reference to Fig. 2. This stopper has a cylindrical boring of even diameter throughout for the passage of the rod $d^2$. However, in this case the auxiliary container $e^2$ is formed with a top portion $y$ of greater diameter, which embraces the bottom part of the stopper $c^2$. On the other hand rod $d^2$ is formed at its bottom end with a flange $q$, the diameter of which is smaller than the enlargement $y$ and greater than the narrower part $e^2$ of the auxiliary vessel. As shown, the auxiliary container is here not suspended from the bottom part of the rod or piston, but from the stopper itself, and the rod $d^2$ serves for forcing it off its seat when pushed into the main container, the flange $q$ at the same time serving to close the auxiliary container.

The modification illustrated in Fig. 4 resembles the one shown in Fig. 2 in that the boring of the stopper has different diameters, a narrow boring being provided for the passage of the rod $d^3$, which carries a solid handle $s$, while the piston is formed in two parts $m^1$ and $m^2$ of larger diameter displaceable in cylindrical cavities $l^1$ and $l^2$ of correspondingly different diameters. The auxiliary vessel $e^3$ is suspended again from the bottom piston $m^2$. A cap $r$ gripping the rim of the neck of the main container covers the stopper $c^3$ and serves as a separate closure.

In the modification shown in Fig. 5, the stopper $c^4$ is fixed in the neck by means of a rubber tube or the like $i^4$, as described with reference to Fig. 2, and has a boring having two diameters, a smaller one for the rod $d^4$ and a greater one for the piston $m^4$. The piston is provided with soft rubber piston rings $u$ and $v$ and has suspended from its bottom end the auxiliary container $e^4$. In this case the rod $d^4$ and piston $m^4$ as well as the stopper $c^4$ may be made of metal and nevertheless the piston rings will airtightly seal the main container $a^4$. An elastic cap $w$ serves for improving the sealing of the opening of container $a^4$, its form being such that the rod $d^4$ can be gripped and displaced without removing the cap.

I wish it to be understood that I do not desire to be limited to the exact details of construction shown and described for obvious modifications will occur to a person skilled in the art.

I claim:

1. Ampule for storing pharmaceutical products comprising a main container, a packing in the opening of said main container, an auxiliary container freely suspended by its neck in said main container near said packing, and means displaceably extending through said packing and adapted to positively disconnect said auxiliary container from its seat.

2. Ampule for storing pharmaceutical products comprising a main container, a packing in the opening of said main container, holding means displaceably mounted in said packing, and an auxiliary container in said main container freely suspended by its neck from said holding means.

3. Ampule for storing pharmaceutical products comprising a main container, a packing in the opening of said main container, holding means displaceably mounted in said packing and an auxiliary container in said main container freely suspended by its neck from and closed by said holding means.

4. Ampule for storing pharmaceutical products comprising a main container, a packing in the opening of said main container, holding means displaceably mounted in said packing, an auxiliary container in said main container freely suspended by its neck from said holding means, and means for limiting the displacement of said holding means.

5. Ampule for storing pharmaceutical products comprising a main container, a packing in the opening of said main container, a rod extending through said packing, and an auxiliary container mounted by its neck on and closed by the bottom end of said rod.

6. Ampule for storing pharmaceutical products comprising a main container, a packing in the opening of said main container, a piston movable in a cylindrical boring of said packing and an auxiliary container mounted by its neck on the bottom end of said piston.

7. Ampule for storing pharmaceutical products comprising a main container, a packing in the opening of said main container, an auxiliary container freely suspended by its neck in said main container near said packing, means displaceably extending through said packing and adapted to positively disconnect said auxiliary container from its seat, and means associated with said auxiliary container for preventing its being pulled into the boring of said packing.

8. Ampule for storing pharmaceutical products comprising a main container, a packing in the opening of said main container, an auxiliary container freely suspended by its neck in said main container near said packing, means displaceably extending through said packing and adapted to positively disconnect said auxiliary container from its seat, and a rim surrounding the neck of said auxiliary container.

In testimony whereof I affix my signature.

LUDWIG WILHELM von GANS.